(12) United States Patent
Bhattacharya et al.

(10) Patent No.: US 12,530,515 B1
(45) Date of Patent: Jan. 20, 2026

(54) MAXIMIZING DETECTABLE DEFECT COVERAGE OF ANALOG CIRCUITS IN INTEGRATED CIRCUIT DESIGN

(71) Applicant: Synopsys, Inc., Mountain View, CA (US)

(72) Inventors: Mayukh Bhattacharya, Palo Alto, CA (US); Huiping Huang, San Jose, CA (US); Mihir Sherlekar, Mountain View, CA (US); Michael Durr, Mountain View, CA (US)

(73) Assignee: Synopsys, Inc., Sunnyvale, CA (US)

( * ) Notice: Subject to any disclaimer, the term of this patent is extended or adjusted under 35 U.S.C. 154(b) by 630 days.

(21) Appl. No.: 17/976,723

(22) Filed: Oct. 28, 2022

Related U.S. Application Data

(60) Provisional application No. 63/273,075, filed on Oct. 28, 2021.

(51) Int. Cl.
*G06F 30/367* (2020.01)
(52) U.S. Cl.
CPC .................................. *G06F 30/367* (2020.01)
(58) Field of Classification Search
CPC .... G06F 30/30; G06F 30/398; G06F 30/3308; G06F 30/33; G06F 30/392; G06F 30/20; G06F 30/367; G06F 30/3312; G06F 2119/18; G06F 30/39; G06F 30/31; G06F 30/38; G06F 3/013; G06F 30/27; G06F 11/27; G06F 11/261; G06F 11/2273; G06F 11/263; G03F 7/705; G03F 7/70625; G03F 7/7065; G03F 1/70; G03F 1/36
USPC .................................................. 716/108–115
See application file for complete search history.

(56) References Cited

U.S. PATENT DOCUMENTS

| 2021/0173007 A1* | 6/2021 | Landman | G06N 3/006 |
| 2021/0294791 A1* | 9/2021 | Narayanaswamy | G06F 11/2635 |
| 2022/0129613 A1* | 4/2022 | Jindal | G06F 30/392 |

* cited by examiner

*Primary Examiner* — Binh C Tat
(74) *Attorney, Agent, or Firm* — Andrew L. Dunlap; Haynes Beffel & Wolfeld LLP

(57) ABSTRACT

A system and method are provided for detectability analysis to identify defective analog components of a circuit. The method includes applying detectability analysis stimuli to the circuit for the purpose of identifying all detectable defects within a defect universe of the circuit, the defect universe including all actual, and potentially undetectable, defects in the circuit, and the applying resulting in an identification of first defects, which is a subset of all of the actual defects within the defect universe. The method further includes applying a user defect analysis to the circuit to identify second defects, which is a subset of all of the actual defects within the defect universe, determining defects, from the first defects, that are not included in the second defects to be not-covered (NC) defects, grouping the NC defects into clusters, and providing the grouped NC defects as a result of the defect detectability analysis.

20 Claims, 9 Drawing Sheets

MAXIMIZING DETECTABLE DEFECT COVERAGE OF ANALOG CIRCUITS IN INTEGRATED CIRCUIT DESIGN

RELATED APPLICATION

This application claims priority to U.S. Provisional Application No. 63/273,075, filed on Oct. 28, 2021, and titled "A SYSTEM TO FACILITATE INCREASED DETECTABLE ANALOG DEFECT COVERAGE", the contents of which are incorporated by reference herein.

TECHNICAL FIELD

The present disclosure generally relates to an electronic design automation (EDA) system. More particularly, the present disclosure relates to maximizing detectable defect coverage of analog circuits in an integrated circuit (IC) design.

BACKGROUND

Digital fault simulation and testing to identify faults have matured to a level that chances of failure in digital components are much lower than in analog components in modern-day mixed-signal integrated circuits (ICs) that include both digital and analog components. In a mixed signal circuit that includes both analog and digital components, it has been observed that most of the product returns (e.g., as much as 80% of product returns) due to defective chips are attributed to the analog portions of the circuits.

SUMMARY

A system and method in accordance with embodiments of the present disclosure provide for an improved defect detectability analysis test to identify the probability of defects in an analog circuit. The defect detectability analysis test includes, at least, two operations that include a first operation of performing stimuli detection analysis and a second operation of applying a user defect. In the first operation, detectability analysis stimuli are applied to the circuit for the purpose of identifying all detectable defects within a defect universe of the circuit, the defect universe including all actual and potentially undetectable defects in the circuit, the applying of the detectability analysis stimuli resulting in an identification of first defects, which is a subset of all of the actual defects within the defect universe. In the second operation, user defect analysis test vector signals are applied to the circuit to identify second defects which are a subset of all of the actual defects within the defect universe. Defects are then identified from the first defects from applying of the detectability analysis stimuli that are not included in the second defects identified by the user defect analysis to be not-covered (NC) defects. The NC defects are then provided as results of the defect detectability analysis.

In some embodiments the NC defects are grouped into clusters and the detectability analysis results are provided with respect to the clusters rather than individual NC defects.

In further embodiments, weighting can be set and applied to the NC defects with higher weights identifying more significant defects. The detectability analysis results can then be provided with a percentage probability of the NC defects occurring based on the weights. With weighting used and NC defects grouped into clusters, the weights can be assigned to each of the clusters based on a sum of weights of the individual NC defects assigned to the cluster. The result of the defect detectability analysis would then use the assigned weights for the clusters to provide a percentage defect probability of defects within each of the clusters. The percentage defect probability would include a percentage assigned to each of the clusters based on the assigned weight for the cluster multiplied by the amount of NC defects determined to be in the cluster. The percentages for all the clusters in a circuit would total 100%.

In a further embodiment with clustering provided, graphing of channel connected blocks (CCBs) can be used to assign the NC defects to particular clusters. Labeling of CCBs in the graph provides a distance determination to enable assignment of NC defects to clusters. A standard CCB graph is created with a label propagation scheme including distance determinations and with the graph label identifying an interrelationship between the CCBs. After one NC defect is assigned to a cluster, additional NC defects then can be assigned to the cluster using the distance feature of the CCB label. The CCB label allows computing a distance from the NC defect assigned so that other NC defects can be identified and assigned to the cluster based on this distance.

In further embodiments, the detectability test analysis stimuli applied includes both static and dynamic stimuli to enable the detectability analysis to be applied to both analog and digital circuitry. In many cases, the analog circuitry defects can only be detected using the static stimuli which is a direct current (DC) stimuli, so the static DC stimuli enables better detection of defects.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
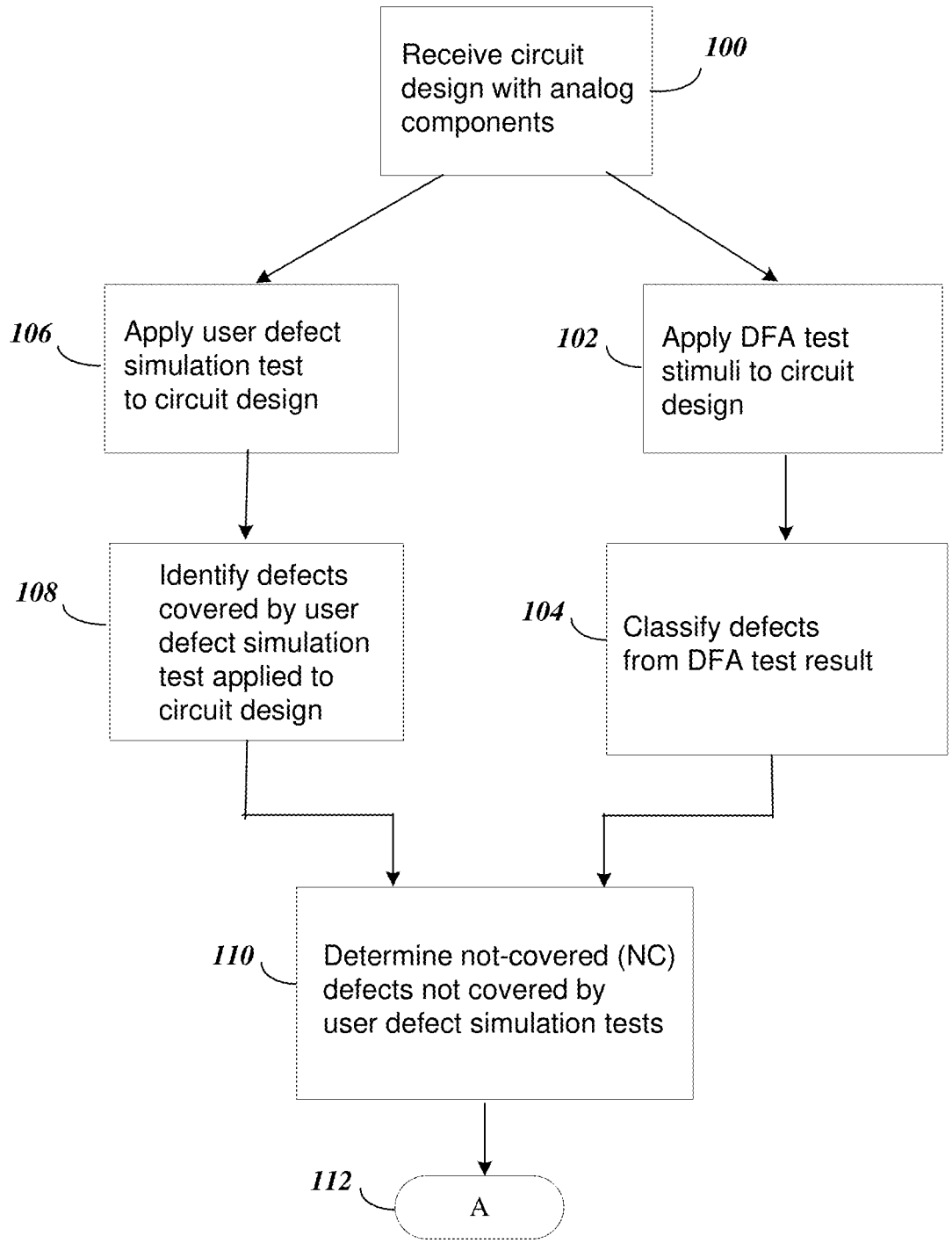
FIG. 1 illustrates a flow chart for performing defect detectability analysis, according to one embodiment.

Aspects of the present disclosure relate to maximizing detectable defect coverage of analog circuits in IC design.

Achieving a relatively high level (e.g., 90% or higher) of detectable defect coverage in an industrial analog or mixed-signal circuit is a challenging and yet important task. A defect refers to an unexpected physical change in a circuit element or a connection between circuit elements that is not within a desired fabrication specification for the circuit element or connection. For example, such a task may involve a process of determining which defects are detectable and hence, if left untested, can cause circuit failure or field return of an integrated circuit (IC). This task often requires expert engineering judgement that is ad hoc and relatively slow. Detectable defect coverage maximization may be directly related to increasing manufacturing yield and minimizing field returns.

Profitability for chip manufacturers is directly related to the number of defective chips returned from customers. The quality of manufacturing tests performed on an IC prior to release (i.e., test coverage) is also directly related to the number of defective chips returned from customers. For example, the defect level (DL) of a component can be calculated as follows: $DL=1-Y^{(1-TC)}$, where Y=yield and TC=test coverage. Improving test coverage to better identify defects in chips that include both digital and analog components is therefore desirable.

Embodiments discussed herein describe a system and method for providing defect simulation, defect detectability analysis, clustering process for identifying not-covered defects, and waiving (e.g., set aside, or otherwise disregard for a period) classes of defects as undetectable. The system allows for the process to be scalable, practical, and efficient, which may lead to coverage maximization with minimal effort.

Technical advantages of the present disclosure include, but are not limited to, expediting the normally slow process of maximizing defect coverage in analog circuits. The present disclosure describes detectability analysis tool and not-covered (NC) defect clustering to prioritize defects that have a higher likelihood of increasing detectable defect coverage.

Considering an example implementation, advanced driver-assist systems (ADAS) are becoming ubiquitous in modern cars and are projected to continue to grow as the automotive industry moves toward totally hands-off-eyes-off autonomous vehicles. Most of the integrated circuits at the heart of ADAS technologies include a substantial number of analog components. Fault simulation of mission-critical circuit components is often suggested as a methodology to compute the quality metrics (e.g., single point fault metric (SPFM), latent fault metric (LFM), probabilistic metric for random hardware failures (PMHF)) recommended by the functional safety standards (e.g., International Organization for Standardization (ISO) 26262). So, both from manufacturing test coverage and from functional safety standpoints, fast and accurate analog fault/defect simulation is of vital importance.

Despite the increasing importance of analog defect simulation, the adoption of analog defect simulators by analog designers has been slower than expected. One reason is that often analog design has redundancy and feedback, leading to defects in many devices that are undetectable. That is, there are many devices where, for example, if there was a short or an unintentional open between terminals, unless controlling points (e.g., inputs) and observation points (e.g., outputs) are placed close to these device terminals, one cannot observe circuit behavior that is different from defect-free circuit behavior, regardless of what input signals are used to excite the circuit and regardless of what external output ports are used to observe the effect of the excitation. If an analog designer, whose designed circuit has been working with very few defect-based field returns over decades, uses an analog defect simulator that cannot help to calculate detectable defect coverage, the simulator would provide the user with a defect coverage percentage that will be much less than the actual defect coverage estimated by the circuit's past yield numbers. However, the removal of undetectable defects from a defect universe ("defect universe" being a term defined herein to include defects that are either actually detectable using a specific known test or potentially detectable by modifying the known test with analysis test tools of other tests) may lead to accurate calculation of metrics such as SPFM and LFM, just to name a few examples, based on defects that can cause circuits to behave dangerously. A defect universe may refer to defect types that are likely to occur in an integrated circuit including, but not limited to, an open circuit, a short circuit, a detectable defect, and an undetectable defect. A detectable defect refers to a defect where a particular defect simulation test stimulus would fail in a presence of such a defect. An undetectable defect refers to a defect that is likely not detected by any defect simulation test stimulus.

Typical, significant manual analysis is required for improving defect coverage of analog circuits. Since analog defect simulators are still nascent in the EDA marketplace and automated detectability analysis of defects is still in its infancy, the process remains largely ad hoc and often laborious, requiring many person-hours of analog circuit design experts. Therefore, it is desirable to have a system that can guide the designer or test engineer to focus on a minimum number of defects and is presented with information regarding each defect that can be used to maximize detectable defect coverage.

FIG. 1 illustrates a flow chart for performing defect detectability analysis, according to embodiments of the present disclosure. FIG. 1 begins at 100, which includes receiving a circuit that includes analog components.

Defect analysis in FIG. 1 takes two different paths including (i) a first path that that begins at 102, which performs static and/or dynamic detectable defect analysis (DFA) to the circuit for identifying defects, and (ii) a second path that begins at 106, which applies a defect simulation test to the circuit for identifying defects covered by the defect simulation test, where covered indicates that the test determines the presence of a defect. Static DFA may provide a relatively faster analysis and is usually performed on the whole circuit design. Dynamic DFA may be performed on a partitioned circuit design. Either static DFA or dynamic DFA may be performed, however, both static and dynamic DFA may provide a better assessment of detectability. The defect simulation test includes applying a set of test inputs to the circuit design.

For FIG. 1, the system may receive an existing defect simulation test as well as a user-defined defect simulation test. At 102, which can be referred to as a DFA test, includes applying detectability analysis stimuli to the circuit for the purpose of identifying all detectable defects within the defect universe of the circuit. The DFA test may include static/structural detectability analysis and/or dynamic detectability analysis as described in more detail below. A detectable defect refers to a defect where a particular defect simulation test stimulus would fail in a presence of such a defect. At 104, defects in the circuit are identified as a result of applying the detectability analysis stimuli. These identified detectable defects can be designated as first defects, which can be a subset of all of the actual defects within the defect universe. Further, remaining defects that are not identified can be designated as undetectable defects. At 108, defects in the circuit are identified as a result of applying the user defect simulation test to the circuit. These identified defects can be designated as second defects, which can be a subset of all of the actual defects within the defect universe. At 110, results from the two paths (i.e., results from the operations 104 and 108) are compared. Specifically, the first defects identified in operation 104 and the second defects identified in operation 108 are compared. Defects from the first defects that are not included in the second defects can be identified as not-covered (NC) defects that are not covered in the defect simulation test results. The results from 110 can be provided for subsequent processing at 112 labeled "A".

Figure 2:
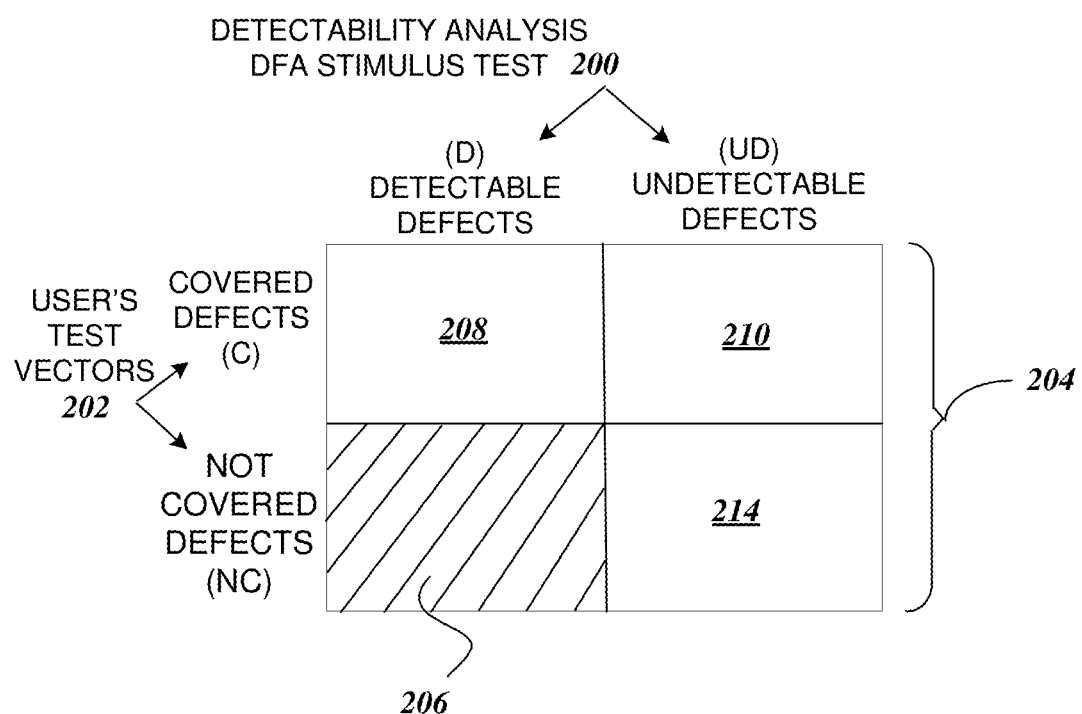
FIG. 2 illustrates a diagram that describes results of a defect detectability analysis, according to one embodiment.

FIG. 2 illustrates a diagram that describes results of a defect detectability analysis, according to one embodiment. A grid 204 shows defects results from the DFA test 200 and user detect simulation test vectors 202 to determine NC detectable defects not covered in the defect simulation tests in a universe of defects. The grid 204 representing the defect universe is divided into four portions 206, 208, 210, and 214. As described above, the defect universe includes detectable and undetectable defects in the circuit. Defect simulation test vectors 202 may include covered (C) defects that result from executing the test vectors 202 (indicated in 208 and 210) and not-covered (NC) defects that are not covered in the test vectors 202 (indicated in 206 and 214). DFA test vectors 200 applied may determine detectable (D) defects (as indicated in 208 and 206) and undetectable (UD) defects (as indicated in 210 and 214) The region of interest defects 206 (e.g., the NC detectable defects of the DFA stimulus test that are not covered by the defect simulation tests) may be a result of the flowchart as described in FIG. 1.

Analog circuits often have redundancy and feedback that lead to many plausible defects to be undetectable. When a defect is undetectable, then it may be preferable to leave the undetectable defect out of test coverage calculations, otherwise the field returns due to manufacturing defects would have little relationship with it: Low test coverage may grossly underestimate yield. Also, the effort spent on trying to develop tests for undetectable defects may often be a waste. In this context, tools that can help analyze detectability automatically have been proposed and developed. Detectable defect analysis may include one or more of static/structural detectability analysis and dynamic detectability analysis, as described below.

A DFA stimulus test may include static/structural detectability analysis, according to one embodiment. Structural analysis of a circuit may lead to a discovery of some defects that would otherwise be undetectable. Structural analysis includes applying a rule to various structures in the circuit. In a 20-series-resistor example, the series connected resistor structure is determined by structural analysis and then a rule is applied to determine whether a defect is detectable (e.g., if length of such structure is >10 or 20, then a short defect on one of the devices is undetectable). For the series chain of 20 identical-valued resistors example, if there is a short defect between the two terminals of one of the resistors, the effect of the defect would not be significant as the change in resistance of the series connection of the 20 resistors would be 5%. Similarly, if there are 20 parallel diodes, and only of them has an open defect at a terminal, the defect would be undetectable.

Apart from defects in series/parallel connected devices, static detectability analysis could also identify certain other defects that may be undetectable, where further analysis may be beneficial. For example, such analysis may identify a metal oxide semiconductor capacitor (MOSCAP) configuration of metal oxide semiconductor field effect transistors (MOSFETs) (source-drain tied together). An open defect of a MOSCAP terminal may be undetectable, for example, if it is used as a decoupling capacitor between power nets. But in a different context, such as in a switched-capacitor filter or in a charge-pump circuit, an open defect in a MOSCAP could be detectable.

Static detectability analysis could also find portions of the circuit that are not in a path to voltage observation points in the circuit. Such circuit elements could be called "unused" circuitry. Certain defects, such as open defects and shorts between nodes within the unused circuit, could be undetectable. But if the test setup includes observations of supply current (e.g., measuring supply current in the quiescent state, known as IDDQ testing), then many defects in the unused circuitry could be detected.

In some embodiments, the static tests applied by the DFA tests use direct current (DC) voltages to identify the analog components that are defective, as non-DC test stimuli will not identify the defective analog components. In other embodiments, the DFA stimulus test includes dynamic detectability analysis. Dynamic detectability analysis may be performed by partitioning a circuit into relatively small blocks and exploring an associated input vector space to determine if tests could be developed for the defects within such blocks. In one embodiment to do this, the dynamic detectability analysis can include identifying a channel connected block (CCB) from a netlist and creating a defect for the CCB to be injected during a simulation. A first measurement of an output node of the CCB is then performed during a first simulation based on providing excitations as inputs to the CCB and a second measurement is also obtained at the output node of the CCB after the defect is injected and a difference comparison is made of the outputs.

To maximize the defect coverage, a process may include analyzing each defect that was not covered to ascertain if the defect is undetectable or if new tests may be developed for it. Depending on the size of these defects, a user may spend days or weeks analyzing such a list. Clustering of defects may alleviate this type of workload. Such clustering is included in embodiments of the present disclosure as described to follow.

Figure 3:
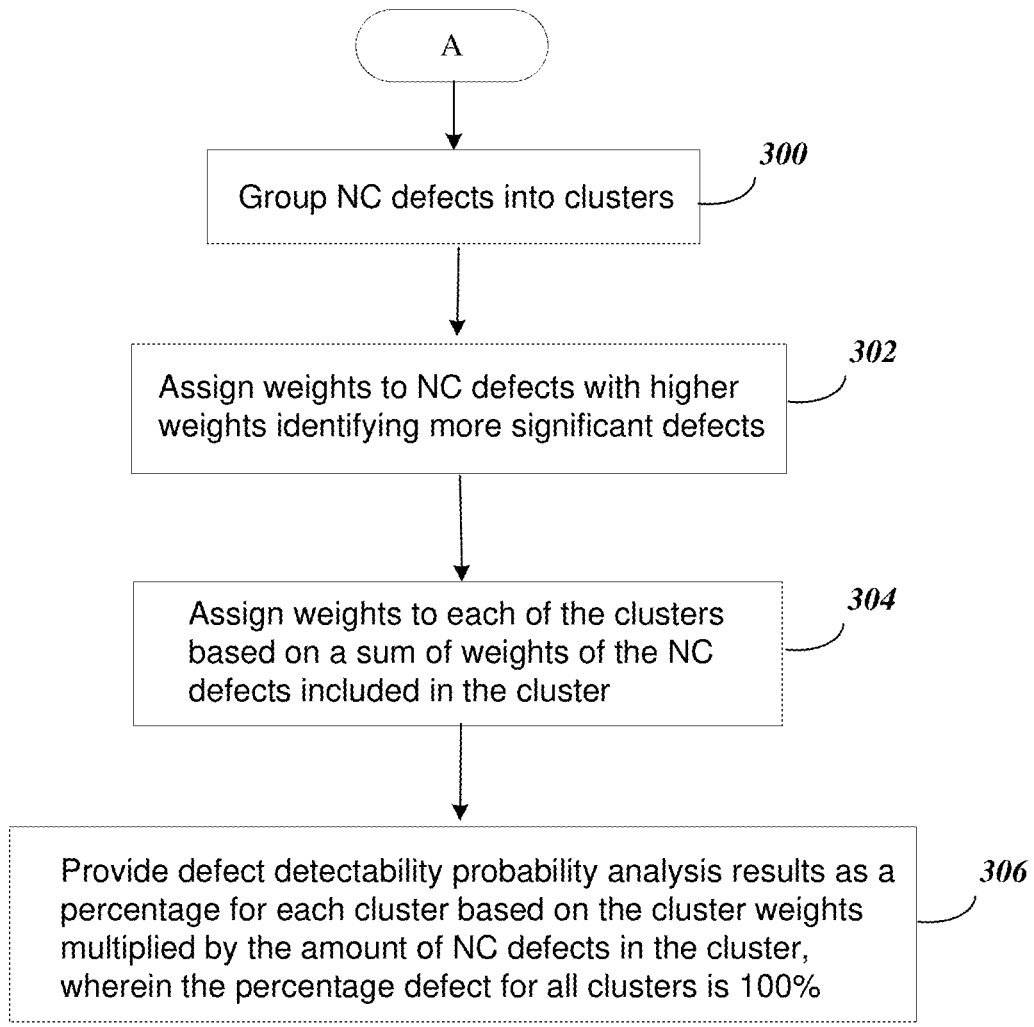
FIG. 3 illustrates a flow chart for performing clustering in a defect detectability analysis, according to one embodiment.

FIG. 3 illustrates a flow chart for performing clustering in a defect detectability analysis, according to one embodiment. FIG. 3 begins from operation "A" 112 of FIG. 1. FIG. 3 continues by grouping the identified NC defects into clusters at 300. Details of clustering of NC defects are described in subsequent paragraphs herein. At 302, weighting is applied to each of the NC defects either individually or in groups to assist with the analysis results (e.g., weights are set for each of the NC defects). Higher weights can be assigned to NC defects in accordance with the significance of the NC defects. For example, the more significant NC defects will be assigned higher weights and less significant NC defects will be assigned lower weights.

In embodiments, weights of defects are determined based on the critical area of the chip—that is, the area on the chip where, if the defect occurs, it will lead to a malfunction. The larger this critical area, the higher the weight assigned to a defect. For example, if a resistor is long and narrow, then the chances of an "open" circuit defect is much higher than for a resistor which is short and wide. In this case, the weight assigned to the open defect will be higher. Weights are, thus, based on the geometry of the device in this embodiment. If layout geometry of the devices are not available, which is often the case in analog defect simulation, then the next best thing is to use device parameters like width, length, area, multiplication factor, etc., to estimate the critical area of certain types of defects.

Although weighting is described at 302 with respect to clustering, weights can be assigned to the NC defects and analysis results provided based on the assigned weights without the use of clustering. At 304, weights are assigned to the individual clusters of NC defects. The cluster weights assigned in operation 304 can be based on a sum of the weights of the NC defects that are assigned to the individual clusters. At 306, defect detectability probability of occurring results are provided based on clustering. For example, a probability percentage for each cluster can be based on the cluster weight multiplied by the amount of NC defects in the cluster. The probability percentage for each cluster can then be provided as a defect analysis result with percentages set so that the total of percentages for all clusters equal to 100%.

The process of FIG. 3 thus includes a clustering process that clusters together the not-covered (NC) detectable defects and then provides a prioritized list of representative defects (e.g., an NC defect list). A user developing analysis of the NC defects may then focus only on such a prioritized list and this aspect of the process may lead to a significantly shortened list of defects for analysis. When analyzing NC the defects a user may pick any defect in the cluster ranging from the highest weighted un-analyzed NC defect in the cluster to the lowest. In some embodiments, each cluster will similarly have many NC defects clustered within it. A user can look at the names of the devices in the highest weighted cluster and pick one for analysis based on their preference.

The clustering process aims at grouping together the NC defects that are most likely to have the same or similar root cause behind their NC status. If the root cause is indeed the same, then by studying any one defect from one cluster may be sufficient to draw conclusions about all the defects in one cluster. If one defect from a cluster is deemed undetectable, then all the defects in that cluster could be considered undetectable. If one defect from a cluster could be stimulated and tested by a particular stimulus, then either the same stimulus or similarly designed stimulus may improve coverage for all defects in its cluster.

The clusters in some embodiments are presented in decreasing order of cluster weights. The weight of a cluster can be calculated by adding up the weights of all the defects in the cluster. This is because a cluster of higher weight will have a higher impact on the coverage than a cluster of lower weight. Accordingly, the present system may provide an indication/recommendation to a user to select clusters in decreasing order of their weights to achieve maximum coverage in the shortest amount of time and by spending relatively little effort. In fact, often a significant increase in coverage can be achieved by analyzing just one defect from each of just the first few clusters. Since in embodiments clusters are sorted in order of reducing weights, the first few clusters should have the highest weights and can easily be identified and selected for analysis.

Below is a list of further aspects of NC defects that enable them to be assigned and identified in clusters, according to some embodiments. First, for each NC defect in the NC defect list various available features are collected, such as (1) type of defect, (2) defect model, (3) device defect or net defect, (4) terminals involved, (5) information generated by a detectable defect analysis tool, if available. Information that can be identified by the defect analysis tool includes for instance: (a) static detectability, (b) dynamic detectability, (c) whether the defect belongs to a spare or a dummy device (such devices could be identified by their names by checking for the presence of certain strings (e.g. dummy, dum, dmy, spare, etc., or a user-defined string) in the name), (d) whether the defect belongs to devices that have no path to observation node (to determine if there is a path, a signal flow graph could be constructed by creating a channel-connected partition of a circuit, if a device belongs to a vertex in such a graph which has no path to the observation nodes, then certain faults (open faults or short faults between nodes that are both within the same vertex) related to such device could be considered to not have any path to observation or output node of the circuit and hence probably, undetectable), and (e) whether the defect belongs to devices that can be regarded as MOSCAP. MOSCAPs are MOSFET devices which are used as metal-oxide-semiconductor capacitors. When the NC defect is a decoupling capacitor or bypass capacitor, open defects on such devices may be undetectable or hard to detect.

For such an NC defect, a further categorization (6) can be used that identifies the device by its full hierarchical name in the following ways: (i) the name is split into words at the hierarchical delimiters (e.g., ".", "/", etc.); and (ii) if the names of two defect instances differ by more than one word, then such defects will not be in the same cluster. Only devices which differ from each other by at most one word in their hierarchical name may be clustered together. Since a goal of the system is to increase the chances of the root cause(s) behind NC categorization of one cluster of defects being the same, keeping the distance among instance names to be one word helps to achieve the goal. If a device name is one-word distant from multiple clusters, it should be assigned to the largest possible cluster. An example of device names which would be considered to be within one word distance from each other: Xtop.Xvreg.Xload1.Xmn1.mn0, Xtop.Xvreg.Xload2.Xmn1.mn0, and Xtop.Xvreg.Xload100.Xmn1.mn0 if the names are split into words by the delimiter ".". A counter example would be: Xtop.Xvreg.Xload1.Xmn1.mn0, Xtop.Xvreg.Xload2.Xmn1.mn0, and Xtop.Xvreg.Xload1.Xmn2.mn0, because the second and third names differ at two words, even though the first name is within a distance of one word from the other two.

In further embodiments, NC defects are clustered using information obtained from detectability analysis, defect properties, etc., such as calculated weights of each cluster, or use weights to sort defect clusters by descending weight. In one approach, the user selects a defect in the highest weight cluster by (i) using information from detectability analysis, user's own knowledge of circuit, etc., and (ii) deciding whether (a) a test can be developed (e.g., coverage increases by weight of cluster, move on to next cluster), (b) a test cannot be developed (e.g., coverage unchanged, move on to next cluster), (c) unused scenario (e.g., coverage increases by weight of cluster, move on to next cluster), or (d) other scenario. In another approach, the system may automatically select a defect in the highest weight cluster by using information from detectability analysis, system's general "knowledge" of circuits. The system can then decide whether items (a), (b), (c) or (d) from above apply.

Figure 4:
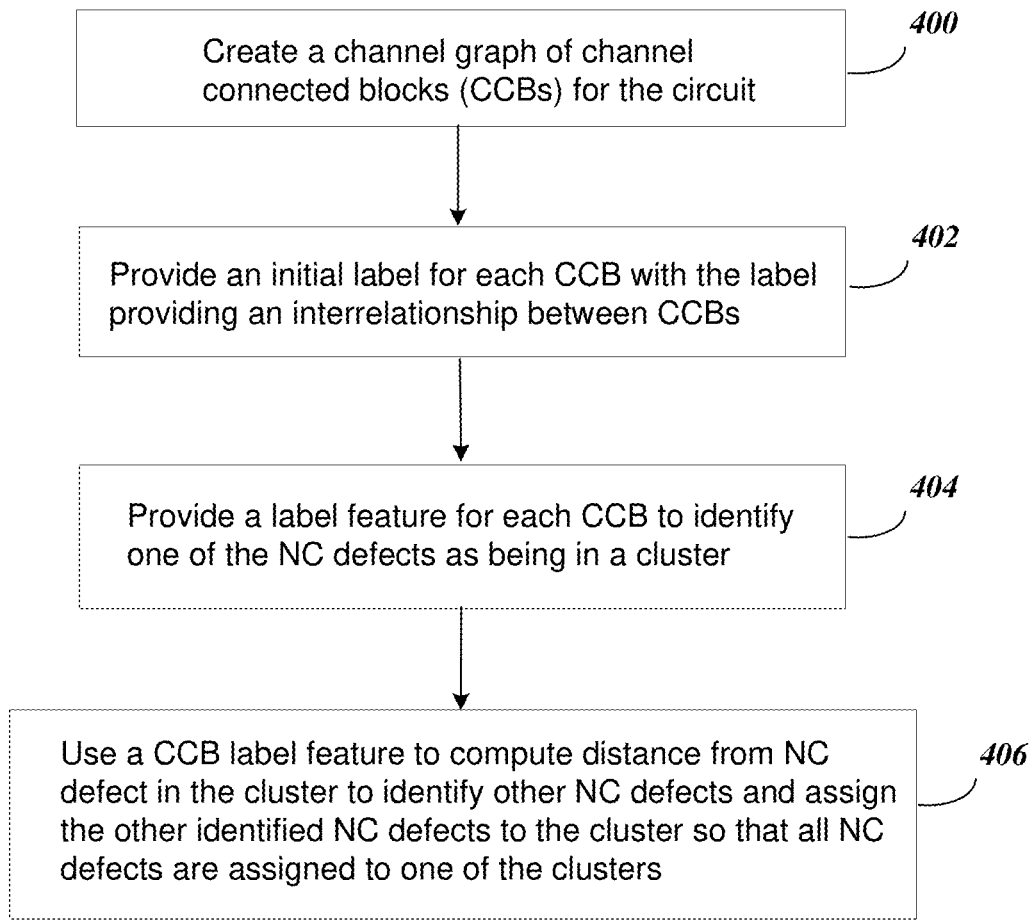
FIG. 4 illustrates a flow chart for grouping not-covered (NC) defects into individual clusters, according to one embodiment.

FIG. 4 is a flow chart showing operations for a further embodiment to group NC defects into individual clusters, as described at 300 of FIG. 3. The operations of FIG. 4 use a channel graph created for channel connected blocks (CCBs) in a circuit to assign NC defects to individual clusters, and such a channel graph is created at 400 (e.g., creating a graph label propagation scheme using a starting label for each of the CCBs to provide information about the CCBs, as further described below). At 402, a starting label for each CCB is created with the starting label providing locating information indicating a distance between the CCBs (or relative location between the CCBs). Other information can be included with the CCB label including if the CCB contains digital circuitry such as a logic gates or analog circuitry such as a MOSFET. Other information that can be included in features identified in the CCB label can include one or more of a circuit type, a defect type, a defect model, a terminal, static detectability, dynamic detectability, and a defect name. At 404, a further label feature for each CCB is provided to identify and assign an initial one of the NC defects to each of the clusters. At 406, the CCB label feature is used to compute a distance of the label feature from the initial NC defect in each cluster to identify and assign other NC defects to individual ones of the clusters.

From the identified NC defects, a user may analyze the test results to identify the NC defects as well as to improve the defect simulation tests to better identify defects so the defects are not identified as NC defects in the future. Results can be obtained for analysis from reference element A 112 of FIG. 1, or results can be obtained from clustering after operation 306 of FIG. 3.

When clustering has been used, the weighting assigned to the clusters can be particularly helpful in analyzing results. After sorting the clusters by decreasing cluster weight, the user may select one or more defects from the cluster (either at random or any other way that the user prefers) from the cluster with a highest weight, wherein none of whose member defects have, so far, been analyzed. The user may analyze one defect per cluster, proceeding from cluster to cluster, until the weights of the remaining clusters are small enough that the impact on coverage would be insignificant. Since the number of clusters may be orders of magnitude smaller than the total number of NC defects, the defects that the user may want to analyze are small. Hence, the user may spend productive effort into analyzing each NC defect by using clustering information.

Figure 5:
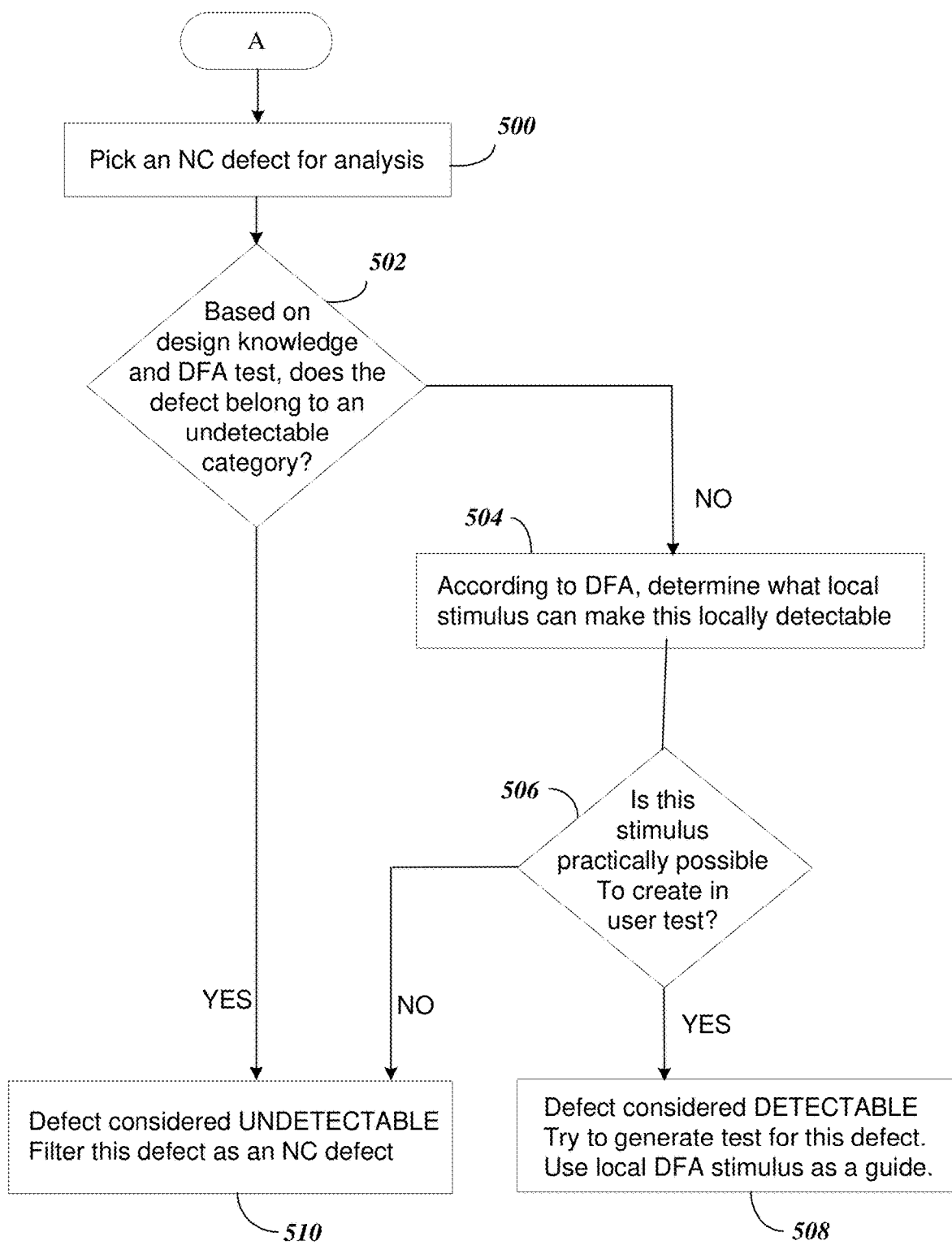
FIG. 5 illustrates a flow chart for applying use of the defect analysis results, according to one embodiment.

FIG. 5 is a flow chart illustrating use of the defect analysis results to better enable analysis of the NC defects as well as to enable improvements to be made to the user defect detection analysis test. FIG. 5 is shown beginning with the results from the analysis at reference element A 112 of FIG. 1. However, as an alternative to using the results at reference element A 112 of FIG. 1, the results FIG. 4 that provide clustering and weighting can also be used to begin the process of FIG. 5. FIG. 5 begins at 500 where a NC defect is chosen for analysis.

Next in FIG. 5, at 502, the present system makes a determination, based on the classified defect results of the DFA test, of whether the chosen NC defect belongs to an undetectable DFA category. If the chosen NC defect belongs to an undetectable DFA category at 502, at 510, the present system labels the NC defect as undetectable filters out the cluster having this NC defect. If the chosen NC defect belongs to a detectable DFA category at 502, at 504, the present system provides a local test stimulus from the DFA test procedure that allows for detection of the NC defect that would otherwise go undetected in the defect simulation test.

At 506, a determination is made if a local test stimulus from the DFA test procedure portion that allows detection of the NC defect can be also created in the defect simulation test. For example, if the DFA test is based on static DFA on the whole circuit design, then the defect simulation test may make use of the local test stimulus. In another example, if the DFA test based on dynamic DFA at the input of a partition containing the defective device, then the local test stimulus at the primary inputs of the circuit or at the internal node(s) of the circuit corresponding to the inputs to the partition containing the defective device may be used. If the local test stimulus cannot be replicated in the defect simulation test as determined by a user, the present system labels the NC defect as undetectable and filters out the cluster having this NC defect at 510. If the local test stimulus can be replicated in the defect simulation test, the present system labels the NC defect as detectable. The present system may provide a recommendation to modify the defect simulation test to detect the defect with the DFA test stimulus as a guide.

From FIG. 5, a user can focus analysis on one defect which can lead to a few outcomes: (a) Either the defect is deemed undetectable; or (b) if the defect is considered detectable, then (i) test stimulus is created to test the defect and its cluster, taking a hint from detectability tool, or (ii) the defect is deemed untestable based on presently used testing methodology.

Based on the classification of the defect by the detectability analysis tool (e.g., dummy, no-path-to-output, MOSCAP, no possible local stimulus, etc.) and including user input optionally, the present system may categorize the defect and its corresponding cluster as undetectable. The weighted detectable defect coverage (DDC) may be defined as the following (equation 1):

$$DDC = (\Sigma \text{Weight of all covered detectable defects}) / (\Sigma \text{Weight of all detectable defects}) \quad [\text{Eqn. 1}]$$

("$\Sigma$" signifies summation, "/" signifies division). DDC increases as the denominator of this equation decreases by the weight of the cluster corresponding to the analyzed defect.

Based on the detectability tool's recommendation of the local test stimulus that can be developed for the detectable defect, the present system may re-calculate the DDC by increasing the numerator of the DDC equation by an amount equal to the cluster weight. Such a DDC calculation may be speculative. For example, the DDC calculation may depend on the user being correct about being able to write new tests. Though this process may be relatively quick, a successful outcome of this process depends on the user being correct. In another implementation, if the user provides the new tests, then the system can be used to run a defect campaign to recalculate the DDC. Though this process may be relatively slow, it may be more accurate than the speculative process just described. The detectability tool's analysis may provide the user with local stimulus that can sensitize the defect. If it is possible to create such stimulus by means of test vectors at the circuit's input and if the effect of the defect can be observed at a detection point, then a test can be developed by the user. Similar conditions would have to be developed for the other defects in the cluster as well, but the effort spent on one defect should be useful in developing tests for the rest of the defects in the cluster.

Even if the detectability analysis tool provides a local stimulus that appears to show the defect, the user may find that such a stimulus is impossible to generate based on the surrounding circuitry or the defect's effect is not possible to be propagated to any observation point (e.g., something which the detectability tool did not consider in its analysis). In such a case, the defect could be categorized as untestable.

To improve coverage of such untestable defects the user may have a few courses of action, such as (1) modify the circuit design, (2) improve access to the defect site to allow the defect to be identified with a stimulus, (3) add new observation points, or (4) develop new types of tests (e.g., IDDQ, etc.).

In an example implementation of the processes and techniques described above, consider an analog/mixed-signal low-dropout (LDO) regulator circuit. The defect universe of this example circuit has 3901 defects. The total weight of the defect universe is 26904.93. Weighted defect coverage of this circuit is low: 20.89%. This circuit presents a scenario where the defect coverage over the entire defect universe is quite low and does not reflect the true yield of this circuit as observed over many years of production. In this example, the methodology begins with a first operation to generate the defect universe and simulate all of the 3901 defects. For device defects, for each device in the circuit and for each pair of terminals, there is a possibility of a "short" defect. Further, for each terminal, there is a possibility of an "open" defect. There could also be other types of defects, such as "net-to-net" short defects that can occur between two nodes in the circuit that are sufficiently close to one another (layout-information may be needed for this type of defect). Similarly, open defects can also occur in long interconnects. A defect compiler can go through all the devices, node-pairs, and nodes to generate the defect universe. The electrical effect of each defect may be modeled by modifying the defect-free circuit. This is then simulated using a circuit simulator.

Figure 6:
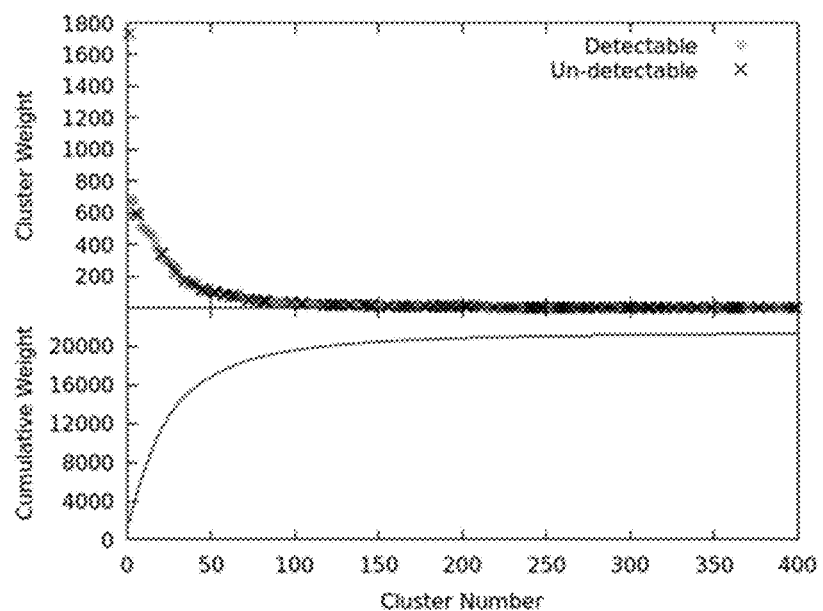
FIG. 6 illustrates a graph depicting clusters in terms of their weights, according to some embodiments.

Weighted defect coverage is calculated and found to be 20.89%. The defects that are not covered (NC defects) are listed. In a second operation, detectable defect analysis is performed using the detectable defect analysis. Such a detectable defect analysis may include a static detectable defect analysis, a dynamic detectable defect analysis, or both. It is possible that the detectability analysis tool has the unique capability of the dynamic detectability analysis. For static analysis, one may use some things like a large number (say greater than 10) of parallel or series devices, such that defects in one device in such a large group may not be detectable. Also, components like MOSCAP (MOSFET capacitors) may be easily detected structurally. In a third operation, the NC defects are clustered as described above. In each cluster, there is to be only one type of defect such that the analysis of one defect in a cluster can help in analysis of the rest. This wouldn't be the case if different defect types are included in one cluster. The clusters are sorted in decreasing order of cluster weights. There are 399 clusters in all. Their weight distribution is illustrated in FIG. 6. Even though there are 399 clusters, the methodology suggests that the user consider the clusters in their sorted order—highest weight first. As can be seen in FIG. 6, by considering the first set of clusters, a significant impact can be made on the detectable defect coverage. Once clusters are created, as mentioned above, they may be sorted by decreasing order of cluster weight (sum of weights of all defects in each cluster). Then only one defect is selected per cluster, starting from the highest-weighted cluster.

In a fourth operation, for instance, the first cluster has a weight of 1732.95. Detectable defect analysis may categorize the defects in this cluster as un-detectable because they are on devices that belong to unused circuitry in the circuit. By analyzing only one representative defect from this cluster, if the user agrees with this assessment, then the entire cluster of defects can be removed from the detectable defect universe. This can lead to improving detectable coverage to 100*5619.29/(26904.9−1732.95)=22.32%. Sub-categories of undetectable defects may include: (i) no path to output: the impact of the defect cannot be observed at circuit outputs (e.g., when a defect is in unused circuitry); (ii) structurally undetectable (e.g., defects are undetectable structurally, if there is a large group of similar devices in parallel or in series, then a defect of any device might be structurally undetectable due to redundancy); and (iii) potentially undetectable (e.g., defects that cannot be detected in dynamic detectable defect analysis). There are also special types of defects that are independent of the sub-categories above, such as for: (i) a digital gate MOSFET (e.g., the defect is associated with digital devices); and (ii) a MOSFET capacitor (e.g., the defect is associated with MOSFET capacitors). Accordingly, in some embodiments, one defect per cluster may be categorized as undetectable if and when the one defect is of a defect type that is included in such a list of undetectable defects.

Figure 7:
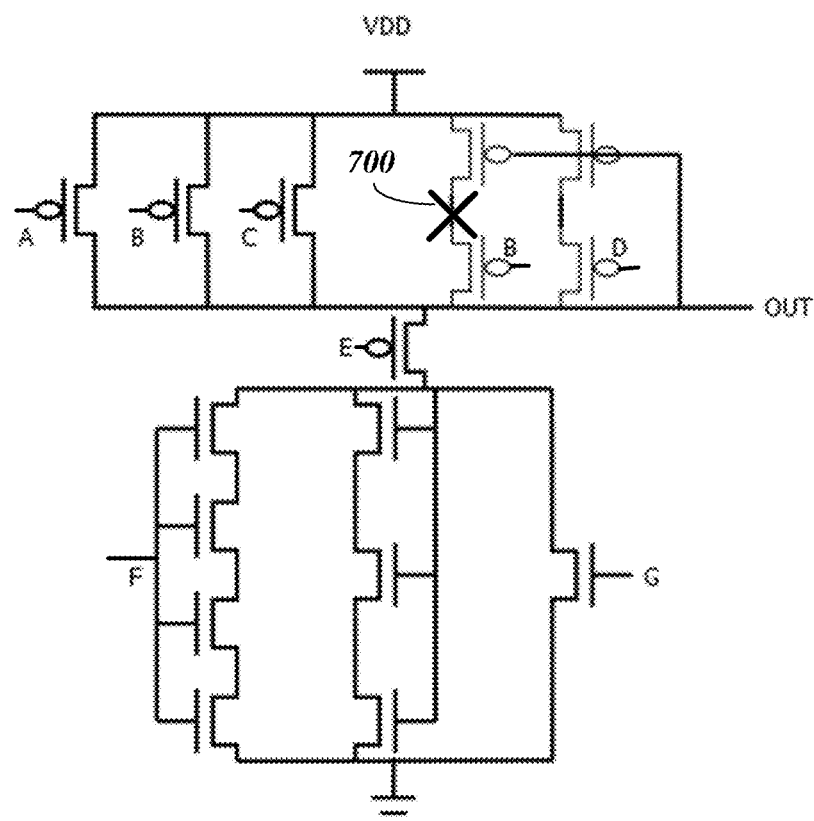
FIG. 7 illustrates a portion of a circuit that includes an example defect, according to some embodiments.
Figure 8:
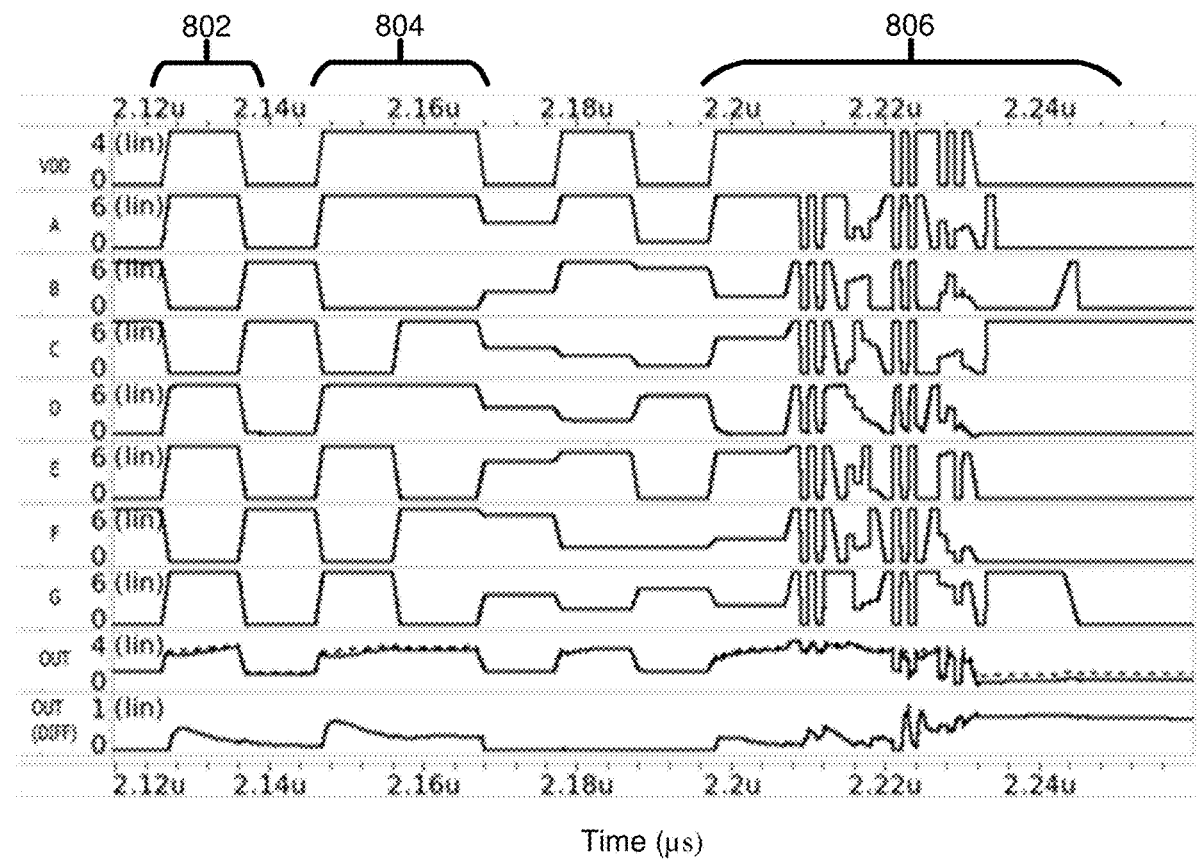
FIG. 8 illustrates a timing diagram depicting test stimuli generated by performing defect detectability analysis, according to some embodiments.

In a fifth operation, for example, cluster number 11 is adjudged to contain detectable defects that are unfortunately not covered by existing tests. This cluster needs further analysis by the test engineer (e.g., user) to see if the tests suggested by the detectability analysis tool are feasible in the context of the whole circuit. One representative defect (an open defect shown by a cross 700) picked from this cluster is shown in FIG. 7 along with its associated channel-connected block (CCB) circuitry. The CCB circuitry includes all of the components shown in FIG. 1. In this example, the existing test is not able to detect this defect. However, the detectability analysis tool has been able to show a set of stimuli, as illustrated in FIG. 8, at the inputs (A, B, C . . . G) of the CCB of FIG. 7 that can cause the defect to be detected at the output node (OUT) of the CCB. The underlying mechanism to detect a defect can be based on impedance. For example, a method of detecting defects in an analog circuit may include operations, such as: identifying a CCB within an analog circuit from a circuit netlist (e.g., the CCB being a partition of the analog circuit determined based on impedances of nodes therein); creating a defect for the CCB to be injected during an analog circuit simulation; obtaining a first measurement of an output node of the CCB by performing a first analog circuit simulation for the CCB based on providing excitations as inputs to the CCB; obtaining a second measurement of the output node of the CCB by performing a second analog circuit simulation for the CCB based on providing the excitations as the inputs to the CCB and injecting the defect; and determining a defect type based on the first measurement and the second measurement. To create the partitioning for this example one could simply have some rules at a topological level. For example, for every device (MOSFET, BJT, JFET, DIODE, Resistor, Capacitor, etc.) the terminals that are known to be of high-impedance are saved in memory. Rules can be looked up to determine grouping of devices and, hence partitioning. Overall in this example, the underlying mechanism to identify the defect is based on impedance.

As illustrated in FIG. 8, which shows signals at points A, B, C . . . in the circuit of FIG. 7, there are three potential sets of inputs in regions 802, 804, and 806 that the tool suggests as test vectors (e.g., around 2.13 microseconds (μs), 2.16 μs, and 2.22 μs). In each of these times, the difference between defect-free and defective circuits (shown in the panel labeled OUT (DIFF)) is seen to be maximized. The test engineer may select any one of these as stimuli to be applied locally by considering the practicality of achieving this at the CCB inputs by generating test inputs at the primary inputs of the whole circuit and propagating the OUT signal to a primary output signal node for defect detection. This can be done for other defects in the same cluster as well, for which careful analysis can be performed by the engineer. Based on whether new tests could be generated or not, guided by the information provided by the detectability analysis tool, the detectable defect coverage may or may not be increased. The engineer could also conclude that the defect is untestable due to surrounding structures of the circuit making it impossible to stimulate the defect or observe its effect.

In a following operation, following the above "greedy methodology" of analyzing the sorted clusters, the test or design engineer can improve the coverage as much as possible within bounded time and effort. As can be seen from the cumulative cluster weight distribution of FIG. 6, the user may have to deal with the top 30-50 clusters to be able to systematically maximize the coverage, knowing that the remaining clusters (out of 399) would not make a significant impact on the coverage.

Figure 9:
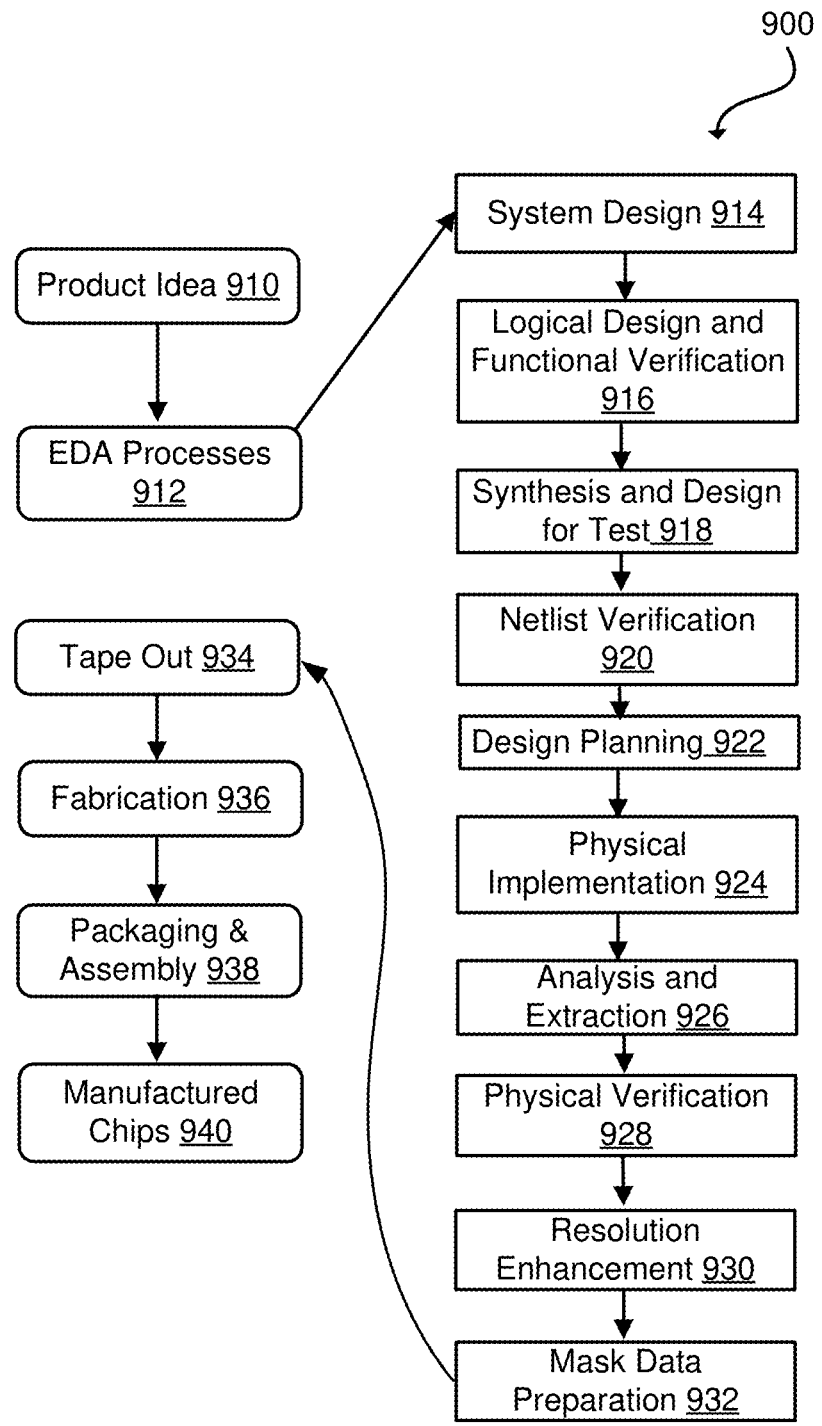
FIG. 9 depicts a flowchart of various processes used during the design and manufacture of an integrated circuit in accordance with some embodiments of the present disclosure.

FIG. 9 illustrates an example set of processes 900 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 910 with information supplied by a designer, information which is transformed to create a article of manufacture that uses a set of EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly processes 938 are performed to produce the finished integrated circuit 940.

Specifications for a circuit or electronic structure may range from low-level transistor material layouts to high-level description languages. A high-level of representation may be used to design circuits and systems, using a hardware description language ('HDL') such as VHDL, Verilog, System Verilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 9. The processes described by be enabled by EDA products (or EDA systems).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
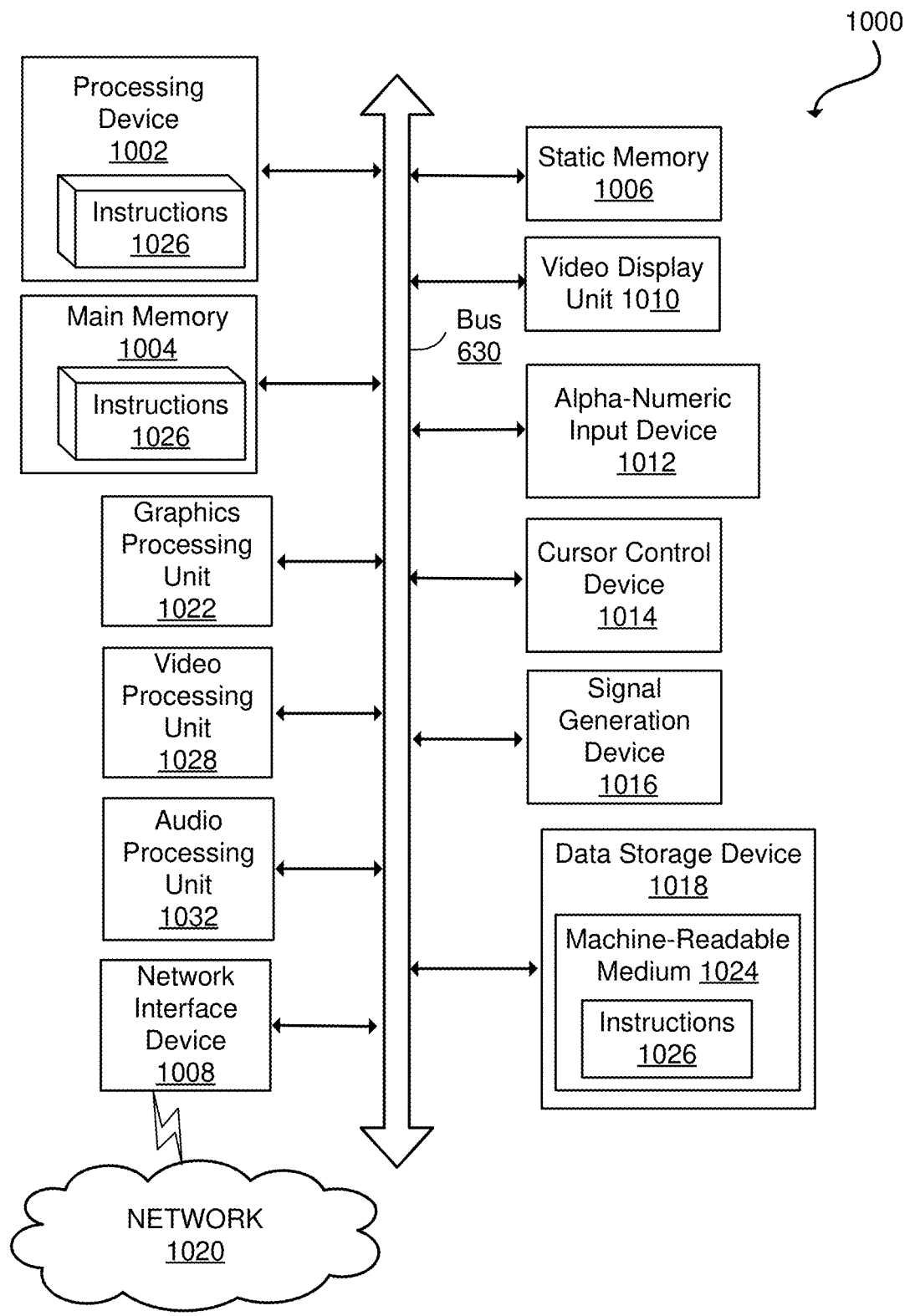
FIG. 10 depicts a diagram of an example computer system in which embodiments of the present disclosure may operate.

FIG. 10 illustrates an example machine of a computer system 1000 within which a set of instructions, for causing the machine to perform any one or more of the methodologies discussed herein, may be executed. In alternative implementations, the machine may be connected (e.g., networked)

to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method for performing defect detectability analysis of a circuit design, the method comprising:
    receiving first defects for the circuit design, wherein the first defects include detectable-type defects within a set of detectable-type defects and undetectable-type defects from a first defect simulation test on the circuit design;
    receiving second defects for the circuit design from a second set subset of possible defect simulation tests for testing the circuit design for defects, wherein at least one of the possible second set of defect simulation tests fails from at least one of the detectable-type defects;
    determining a portion of the defects from the first defects that are not included in the second defects, as not-covered (NC) detectable defects;
    grouping the NC detectable defects into clusters; and
    selecting a respective NC detectable defect from at least one of the clusters to generate, based at least in part on the selected NC detectable defect, at least one additional defect simulation test stimulus to include in the second set of defect simulation tests.

2. The method of claim 1, further comprising:
    setting a defect weight for each of the NC defects, wherein weighting is based on a geometry of a device having the NC defect; and
    assigning a cluster weight to each of the clusters based on a sum of the defect weights of the NC defects grouped in the cluster.

3. The method of claim 2,
    wherein a result of the defect detectability analysis includes a percentage assigned to each of the clusters based on the assigned weight for the cluster multiplied by an amount of NC defects determined to be in the cluster.

4. The method of claim 3, wherein a total of percentages for all the clusters of the circuit design totals 100%.

5. The method of claim 1, further comprising:
    creating a graph of channel connected blocks (CCBs) in the circuit design, wherein a CCB is a partition of the circuit design;
    generating a label for each of the CCBs in the graph;
    creating a graph label propagation scheme using an initial label as a starting one of the labels for each of the CCBs to enable a determination of interrelationships between CCBs;
    receiving a feature in the label for each of the CCBs that identifies one of the NC detectable defects in the cluster; and
    determining an additional one of the NC detectable defects to add to the cluster based on a threshold distance between respective features of the one of the NC detectable defects and the additional one of the NC detectable defects.

6. The method of claim 5, wherein the feature includes one or more of a circuit type, a defect type, a defect model, a terminal, static detectability, dynamic detectability, and a defect name.

7. The method of claim 1,
    wherein the first defects are identified by applying detectability analysis stimuli including dynamic stimuli to the circuit design,
    wherein the first defects are identified based on impedance determined from the dynamic stimuli.

8. The method of claim 1,
    wherein the first defects are identified by applying detectability analysis stimuli including static stimuli to the circuit design,
    wherein the first defects are identified based on impedance determined from the static stimuli.

9. The method of claim 8, wherein the static stimuli is a direct current (DC) stimuli.

10. The method of claim 8, further comprising adding an additional test stimulus to the second set of defect simulation tests test to identify one of the corresponding NC detectable defects not previously detectible based on results of the defect detectability analysis.

11. A system for defect detectability analysis of a circuit design, the system comprising:
    a memory storing instructions; and
    a processor coupled with the memory and to execute the instructions, the instructions when executed causing the processor to:
        apply detectability analysis stimuli to the circuit design for the purpose of identifying all detectable defects within a defect universe of the circuit design, the defect universe including all actual, and potentially undetectable, defects in the circuit design, and the applying of the detectability analysis stimuli resulting in an identification of first defects, which is a subset of all of the actual defects within the defect universe;
        apply a defect analysis to the circuit design to identify second defects, which is a subset of all of the actual defects within the defect universe;
        determine defects, from the first defects identified by the applying of the detectability analysis stimuli, that are not included in the second defects identified by the defect analysis to be not-covered (NC) defects;
        provide the NC defects as a result of the defect detectability analysis; and
        select a respective NC defect to generate, based at least in part on the selected NC defect, at least one additional defect simulation test stimulus to include in the defect analysis.

12. The system of claim 11, wherein the instructions when executed further cause the processor to:
    assign weights for each of one or more categories of the NC defects with higher weights identifying more significant defects; and
    provide the defect detectability analysis results as a percentage of probabilities of defects based on the assigned weights.

13. The system of claim 12, wherein the percentage of the probabilities of defects includes a percentage assigned to individual ones of the NC defects with a total percentage sum of all the NC defect percentages equal to 100%.

14. The system of claim 11, wherein the instructions when executed further cause the processor to:
- inject a defect type into the circuit design;
- perform the defect analysis on the circuit design with the injected defect type; and
- identify the defect type as a NC defect type when the defect is not detected by the defect analysis.

15. The system of claim 11,
- wherein the applying of the detectability analysis stimuli comprises applying both static and dynamic stimuli to identify the first defects, and
- wherein the NC defects include defects that can be detected by the static stimuli but cannot be detected by the dynamic stimuli.

16. The system of claim 15, wherein the static stimuli is a direct current (DC) stimuli.

17. The system of claim 15, wherein the first defects are determined from machine learning after applying the detectability analysis stimuli multiple times.

18. A non-transitory computer readable medium comprising stored instructions for performing defect detectability analysis of a circuit design, which when executed by a processor, cause the processor to:
- apply detectability analysis stimuli to the circuit design for the purpose of identifying all detectable defects within a defect universe of the circuit design, the defect universe including all actual, and potentially undetectable, defects in the circuit design, and the applying of the detectability analysis stimuli resulting in an identification of first defects, which is a subset of all of the actual defects within the defect universe;
- apply a defect analysis to the circuit design to identify second defects, which is a subset of all of the actual defects within the defect universe;
- determine defects, from the first defects identified by the applying of the detectability analysis stimuli, that are not included in the second defects identified by the defect analysis to be not-covered (NC) defects;
- group the NC defects into clusters;
- provide the NC defects as grouped into clusters as a result of the defect detectability analysis; and
- determine an additional one of the NC defects to add to one of the clusters based on a threshold distance between respective features of one of the NC defects and the additional one of the NC defects.

19. The non-transitory computer readable medium comprising stored instructions of claim 18, which when executed by the processor further cause the processor to:
- set weights for each of the NC defects with higher weights identifying more significant defects; and
- assign weights to each of the clusters based on a sum of weights of the NC defects included in the cluster, wherein the result of the defect detectability analysis uses the assigned weights for the clusters to provide a percentage defect probability of defects for each of the clusters,
- wherein the percentage defect probability includes a percentage assigned to each of the clusters based on the assigned weight for the cluster multiplied by an amount of NC defects determined to be in the cluster.

20. The non-transitory computer readable medium comprising stored instructions of claim 18, which when executed by the processor further cause the processor to:
- create a graph of channel connected blocks (CCBs) in the circuit design;
- provide an initial label for each of the CCBs in the graph;
- create a standard graph label propagation scheme using the initial label as a starting one of the labels for each of the CCBs to enable a determination of interrelationships between CCBs;
- provide a feature in the label for each of the CCBs that identifies one of the NC defects in the cluster; and
- use the label feature of each of the clusters to compute distance to enable further inclusion of remaining ones of the NC defects into appropriate ones of the clusters.

\* \* \* \* \*